US011582253B2

(12) United States Patent
Richman et al.

(10) Patent No.: US 11,582,253 B2
(45) Date of Patent: Feb. 14, 2023

(54) AUTOMATED MONITORING OF PROXIMATE DEVICES

(71) Applicant: Bank of America Corporation, Charlotte, NC (US)

(72) Inventors: Adam B. Richman, Charlotte, NC (US); Brady P. Merkel, Jacksonville Beach, FL (US); Annika Decker, Charlotte, NC (US); Mary K. Barrett, Weymouth, MA (US); Elizabeth Swanzy-Parker, Charlotte, NC (US); Mathew A. Woodyard, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 343 days.

(21) Appl. No.: 17/022,381

(22) Filed: Sep. 16, 2020

(65) Prior Publication Data

US 2022/0086181 A1    Mar. 17, 2022

(51) Int. Cl.
*H04L 29/06* (2006.01)
*H04L 9/40* (2022.01)
*G06N 20/00* (2019.01)
*H04L 43/065* (2022.01)
*H04L 9/06* (2006.01)

(52) U.S. Cl.
CPC ......... *H04L 63/1425* (2013.01); *G06N 20/00* (2019.01); *H04L 9/0643* (2013.01); *H04L 43/065* (2013.01); *H04L 63/0892* (2013.01); *H04L 63/306* (2013.01)

(58) Field of Classification Search
CPC . H04L 63/1425; H04L 9/0643; H04L 43/065; H04L 63/0892; H04L 63/306; H04L 2209/805; H04L 9/3297; H04L 41/082; H04L 63/108; H04L 63/0414; H04L 63/107; G06N 20/00; H04W 12/02
See application file for complete search history.

(56) References Cited

U.S. PATENT DOCUMENTS

| 7,027,808 | B2 | 4/2006 | Wesby |
| 9,465,958 | B2 | 10/2016 | Gardner |
| 10,097,481 | B2* | 10/2018 | Narayanaswamy .... H04L 67/63 |
| 10,349,234 | B1 | 7/2019 | Rivkin |
| 2001/0046862 | A1 | 11/2001 | Coppinger et al. |
| 2017/0149795 | A1 | 5/2017 | Day, II |

(Continued)

*Primary Examiner* — Mahfuzur Rahman
(74) *Attorney, Agent, or Firm* — Banner & Witcoff, Ltd.

(57) ABSTRACT

Aspects of the disclosure relate to an automated monitoring of proximate devices. A computing platform may cause a reporting device to detect a target device in a local network, retrieve network data associated with the target device, and send, to an intermediate server, the network data. The computing platform may send, to the intermediate server, a query. The intermediate server may send the network data in response to the query. Based on the network data, the computing platform may determine an amount of time that has elapsed since network activity was previously detected for the target device, and based on a determination that the amount of time exceeds a predetermined time threshold, the computing platform may generate an alert notification indicating that the target device may need to be traced. Subsequently, the alert notification may be sent to the reporting device.

20 Claims, 5 Drawing Sheets

(56) References Cited

U.S. PATENT DOCUMENTS

2018/0146088 A1     5/2018  Moshir et al.
2019/0364492 A1*   11/2019  Azizi ................ H04W 52/0261
2021/0365482 A1*   11/2021  Kim ....................... G06N 20/00

* cited by examiner

AUTOMATED MONITORING OF PROXIMATE DEVICES

BACKGROUND

Aspects of the disclosure relate to deploying digital data processing systems to create and/or manage enterprise devices. In particular, one or more aspects of the disclosure relate to an automated monitoring of proximate devices.

Enterprise organizations may utilize various computing infrastructure to manage and/or store data and information related to a business of the enterprise organization. For example, one or more enterprise devices may be utilized by employees of the enterprise organization. Such enterprise devices may need to be monitored for security compliance, and an inability to effectively locate an enterprise device may impact compliance with a security profile of the enterprise organization. Ensuring that such enterprise devices are regularly located in a timely and searchable manner, and changes, updates, and/or monitoring activities are performed seamlessly, may be highly advantageous to providing an efficient and effective platform to users of the enterprise organization.

SUMMARY

Aspects of the disclosure provide effective, efficient, scalable, fast, reliable, and convenient technical solutions that address and overcome the technical problems associated with automated monitoring of proximate devices.

In accordance with one or more embodiments, a computing platform having at least one processor, and memory storing computer-readable instructions that, when executed by the at least one processor, cause the computing platform to cause a reporting device to detect a target device in a local network, wherein the target device is proximate to the reporting device, and wherein the reporting device is associated with an enterprise server. Subsequently, the computing platform may, after detection of the target device, cause the reporting device to retrieve, from the local network, network data associated with the target device, wherein the network data is indicative of network activity of the target device in the local network. Then, the computing platform may cause the reporting device to send, to an intermediate device tracking server, the network data and a first device identifier associated with the reporting device. Subsequently, the computing platform may send, from the enterprise server and to the intermediate device tracking server, a query comprising a second device identifier. Then, the computing platform may, in response to the query, cause the intermediate device tracking server to compare the first device identifier and the second device identifier. Then, the computing platform may, based on a determination that the first device identifier matches the second device identifier, cause the intermediate device tracking server to send, to the enterprise server, the network data. Subsequently, the computing platform may determine, based on the network data, an amount of time that has elapsed since network activity was previously detected for the target device. Then, the computing platform may compare the amount of time to a predetermined time threshold. Then, the computing platform may, based on a determination that the amount of time exceeds the predetermined time threshold, generate an alert notification indicating that the target device may need to be traced. Subsequently, the computing platform may send, to the reporting device, the alert notification.

In some embodiments, the computing platform may cause the reporting device to download and install a mobile application to monitor the target device.

In some embodiments, the reporting device may be a network router, and the computing platform may cause the network router to upgrade firmware to monitor the target device.

In some embodiments, the local network may include one of a Bluetooth connectivity network, a near field communication network, a fifth generation cellular network, or a geolocation-based network.

In some embodiments, the first device identifier and the second device identifier may be encrypted.

In some embodiments, the computing platform may train a machine learning model to detect patterns of the network activity. Then, the computing platform may predict, based on the machine learning model, whether the target device may need to be traced.

In some embodiments, the computing platform may identify, based on the network data, a location of the target device, and where the retrieving of the network data may be automatically modified based on data privacy laws governing the identified location.

In some embodiments, the computing platform may determine that the target device cannot be traced. Then, the computing platform may automatically deactivate the target device.

In some embodiments, the computing platform may train a machine learning model to detect a timing of the network activity. Then, the computing platform may compare, for an enterprise user associated with the reporting device, working hours with the detected timing. Subsequently, the computing platform may, upon detecting anomalous working hours, automatically send a notification to the enterprise user.

In some embodiments, the computing platform may provide, via an interactive graphical user interface managed by the enterprise server, a search field to search for a target device, a selectable icon to initiate a query to the intermediate device tracking server, and information comprising a plurality of reporting devices, target devices associated with the plurality of reporting devices, and network data associated with the target devices.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Organizations generally manage computing devices associated with the organization. Such devices may be monitored, tracked, and notifications and/or updates may be pushed onto the devices. However, in many instances, organizations may purchase devices and provide these devices to employees, and the devices may not be on the organization's network, and/or may not be managed by the organization. For a variety of reasons, it may be highly advantageous for an organization to track locations of such unmanaged devices.

Generally, it may be preferable for an organization to perform such tracking activities on a target device without a knowledge of the target device. Also, for example, it may be preferable for an organization to perform such tracking activities without any direct association with and/or ownership of the target device.

As described herein, a system of obfuscating a tracking tag for a target device is proposed, as well as a system to obfuscate the tracking so that there is no direct line of ownership between the target device and the organization. A proximate device may be configured to collect network data associated with the target device over a local network, provide the network data to an intermediate server, and the organization may be able to query the intermediate server to retrieve the network data.

Figure 1A:
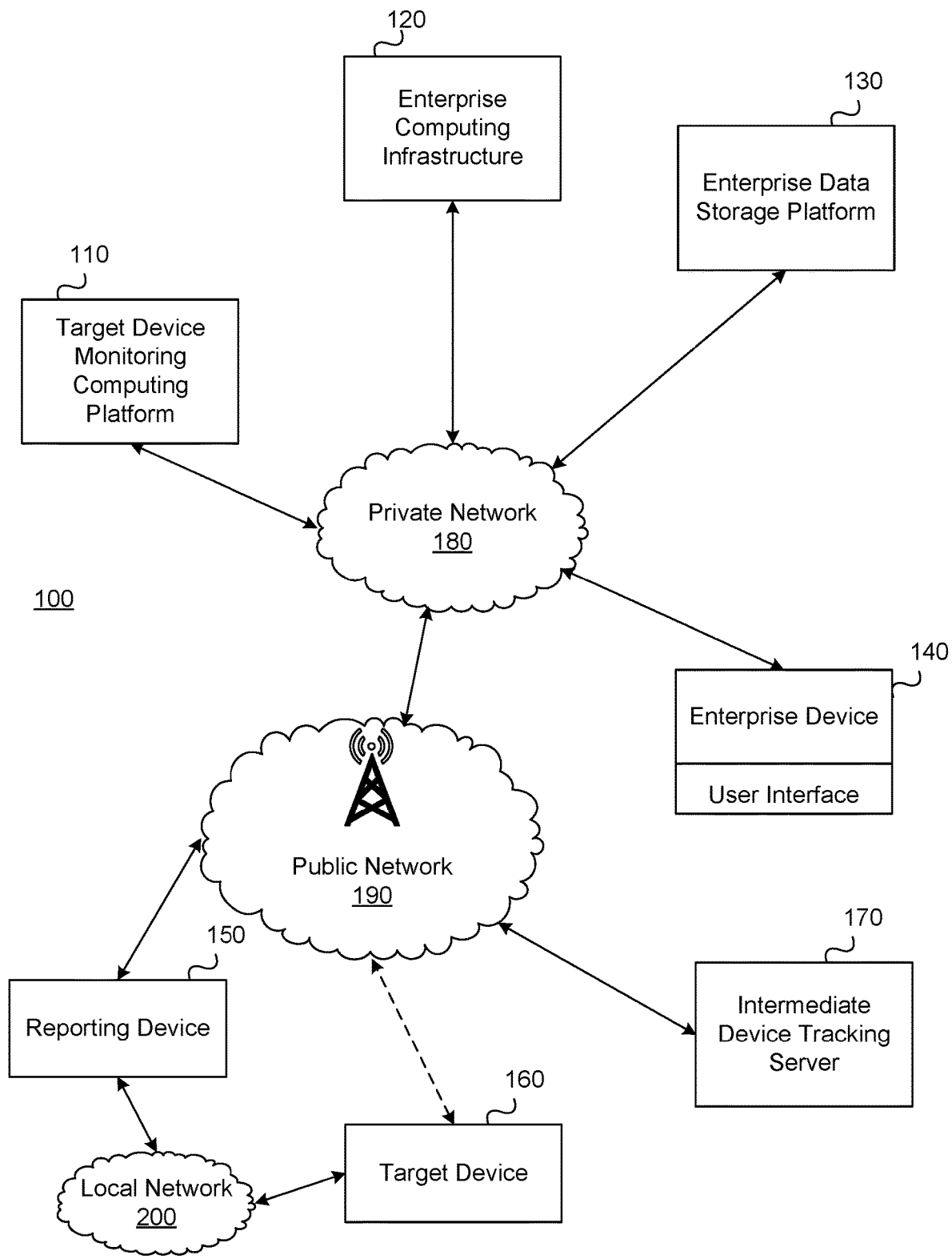
FIGS. 1A and 1B depict an illustrative computing environment for an automated monitoring of proximate devices.
Figure 1B:
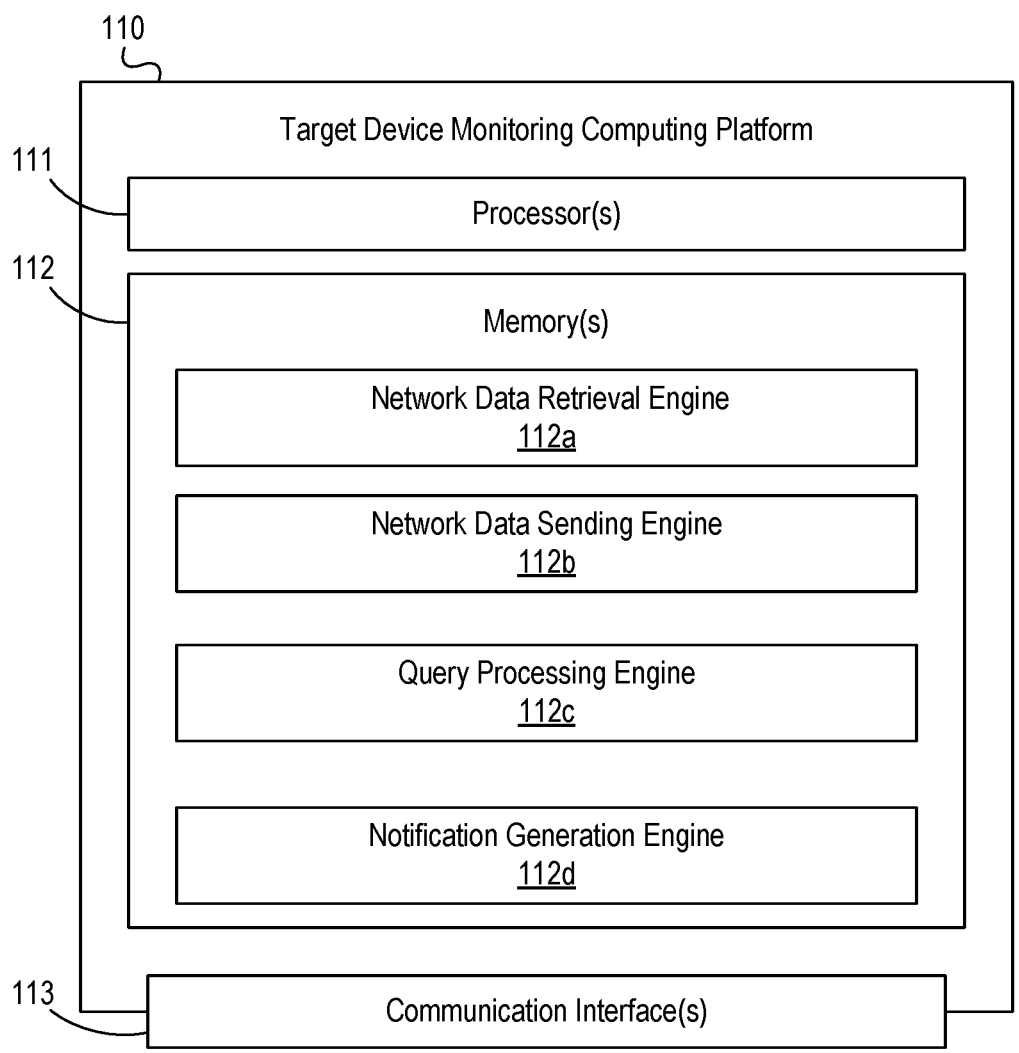

FIGS. 1A and 1B depict an illustrative computing environment for an automated monitoring of proximate devices. Referring to FIG. 1A, computing environment 100 may include one or more computer systems. For example, computing environment 100 may include a target device monitoring computing platform 110, enterprise computing infrastructure 120, an enterprise data storage platform 130, enterprise device 140 (including a user interface), reporting device 150, target device 160, and intermediate device tracking server 170.

As illustrated in greater detail below, target device monitoring computing platform 110 may include one or more computing devices configured to perform one or more of the functions described herein. For example, target device monitoring computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more user interfaces, for example, associated with enterprise device 140. For example, enterprise computing infrastructure 120 may be configured to host, execute, and/or otherwise provide one or more applications associated with an enterprise organization. In some instances, enterprise computing infrastructure 120 may be configured to provide various enterprise and/or back-office computing functions for an enterprise organization. For example, enterprise computing infrastructure 120 may manage and/or monitor various enterprise devices. Additionally or alternatively, enterprise computing infrastructure 120 may receive instructions from target device monitoring computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. For example, enterprise data storage platform 130 may be configured to store and/or otherwise maintain, log files, security profiles, data privacy requirements, data security requirements, and so forth. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Enterprise device 140 may be an enterprise computing device, such as, associated with a personal computing device (e.g., desktop computer, laptop computer) or mobile computing device (e.g., smartphone, tablet) Enterprise device 140 may be a device on, and/or having access to, private network 180, of an enterprise organization. In addition, user interface associated with enterprise device 140 may be linked to and/or used by a specific enterprise user (e.g., an employee of an organization operating target device monitoring computing platform 110). Also, for example, user interface associated with enterprise device 140 may be configured to interact with the enterprise user, receive a query, and provide one or more search results in response to the query.

Reporting device 150 may be a user computing device, such as a personal computing device (e.g., desktop computer, laptop computer) or mobile computing device (e.g., smartphone, tablet). Also, for example, reporting device 150 may be a network router with an upgraded firmware that may be configured to track devices, such as, for example, target device 160, on a network (e.g., public network 190, local network 200). Reporting device 150 may be a device on, and/or having access to, public network 190, and may be external to an enterprise organization. In some embodiments, reporting device 150 may be a device on, and/or having access to, local network 200. In some embodiments, reporting device 150 may be registered to, and/or managed by, an enterprise organization that hosts enterprise computing infrastructure 120.

Target device 160 may be a user computing device, such as a personal computing device (e.g., desktop computer, laptop computer) or mobile computing device (e.g., smartphone, tablet). Target device 160 may be a device on, and/or having access to, public network 190, and may be external to an enterprise organization. In some embodiments, target device 160 may be a device on, and/or having access to, local network 200. Generally, target device 160 may not be registered to, or managed by, an enterprise organization that hosts enterprise computing infrastructure 120. However, reporting device 150 may be proximate to target device 160, and reporting device 150 may view network activity associated with target device 160 over local network 200. In some embodiments, as indicated by the dashed arrow, target device 160 may be connected to public network 190.

Intermediate device tracking server 170 may comprise one or more servers that collect data from network devices. For example, intermediate device tracking server 170 may be configured to receive data from reporting device 150 over public network 190, and intermediate device tracking server 170 may be configured to receive a query from target device monitoring computing platform 110, and to send network data in response to the query.

Computing environment 100 also may include one or more networks, which may interconnect one or more of target device monitoring computing platform 110, enterprise computing infrastructure 120, enterprise data storage platform 130, enterprise device 140 (including a user interface), reporting device 150, target device 160, and intermediate device tracking server 170. For example, computing environment 100 may include a private network 180 (which may, e.g., interconnect target device monitoring computing platform 110, enterprise computing infrastructure 120, enterprise data storage platform 130, enterprise device 140, and/or one or more other systems which may be associated with an organization) and public network 190 (which may, e.g., interconnect reporting device 150, target device 160, intermediate device tracking server 170, with private network 180 and/or one or more other systems, public networks, sub-networks, and/or the like). In some embodiments, public network 190 may be a high generation cellular network, such as, for example, a 5G or higher cellular network. In some embodiments, private network 180 may likewise be a high generation cellular enterprise network, such as, for example, a 5G or higher cellular network. In some embodiments, computing environment 100 also may include a local network 200 (which may, e.g., interconnect reporting device 150 and target device 160 with each other). Generally, local network 200 may be, for example, a Bluetooth (BT) connectivity network, a near field communication (NFC) network, a fifth generation cellular network, a local area network (LAN), a wide area network (WAN), or a geolocation-based network.

In one or more arrangements, enterprise computing infrastructure 120, enterprise data storage platform 130, enterprise device 140 (including a user interface), reporting device 150, target device 160, and intermediate device tracking server 170, and/or the other systems included in computing environment 100 may be any type of computing device capable of receiving input via a user interface, and communicating the received input to one or more other computing devices. For example, enterprise computing infrastructure 120, enterprise data storage platform 130, enterprise device 140 (including a user interface), reporting device 150, target device 160, and intermediate device tracking server 170, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of target device monitoring computing platform 110, enterprise computing infrastructure 120, enterprise data storage platform 130, enterprise device 140 (including a user interface), reporting device 150, target device 160, and intermediate device tracking server 170, may, in some instances, be special-purpose computing devices configured to perform specific functions.

Referring to FIG. 1B, target device monitoring computing platform 110 may include one or more processors 111, memory 112, and communication interface 113. A data bus may interconnect processor 111, memory 112, and communication interface 113. Communication interface 113 may be a network interface configured to support communication between target device monitoring computing platform 110 and one or more networks (e.g., network 150, network 160, a local network, or the like). Memory 112 may include one or more program modules having instructions that when executed by processor 111 cause target device monitoring computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of target device monitoring computing platform 110 and/or by different computing devices that may form and/or otherwise make up target device monitoring computing platform 110. For example, memory 112 may have, store, and/or include a network data retrieval engine 112a, a network data sending engine 112b, a query processing engine 112c, and a notification generation engine 112d.

Network data retrieval engine 112a may have instructions that direct and/or cause target device monitoring computing platform 110 to cause a reporting device to detect a target device in a local network, wherein the target device is proximate to the reporting device, and wherein the reporting device is associated with an enterprise server, as discussed in greater detail below. In some embodiments, network data retrieval engine 112a may have instructions that direct and/or cause target device monitoring computing platform 110 to, after detection of the target device, cause the reporting device to retrieve, from the local network, network data associated with the target device, wherein the network data is indicative of network activity of the target device in the local network.

Network data sending engine 112b may have instructions that direct and/or cause target device monitoring computing platform 110 to cause the reporting device to send, to an intermediate device tracking server, the network data and a first device identifier associated with the reporting device.

Query processing engine 112c may have instructions that direct and/or cause target device monitoring computing platform 110 to send, from the enterprise server and to the intermediate device tracking server, a query comprising a second device identifier. In some embodiments, query processing engine 112c may have instructions that direct and/or cause target device monitoring computing platform 110 to, in response to the query, cause the intermediate device tracking server to compare the first device identifier and the second device identifier. Also, for example, query processing engine 112c may have instructions that direct and/or cause target device monitoring computing platform 110 to, based on a determination that the first device identifier matches the second device identifier, cause the intermediate device tracking server to send, to the enterprise server, the network data.

Notification generation engine 112d may have instructions that direct and/or cause target device monitoring computing platform 110 to determine, based on the network data, an amount of time that has elapsed since network activity was previously detected for the target device. In some embodiments, notification generation engine 112d may have instructions that direct and/or cause target device monitoring computing platform 110 to compare the amount of time to a predetermined time threshold. As another example, notification generation engine 112d may have instructions that direct and/or cause target device monitoring computing platform 110 to, based on a determination that the amount of time exceeds the predetermined time threshold, generate an alert notification indicating that the target device may need to be traced. Also, for example, notification generation engine 112d may have instructions that direct and/or cause target device monitoring computing platform 110 to send, to the reporting device, the alert notification.

Figure 2:
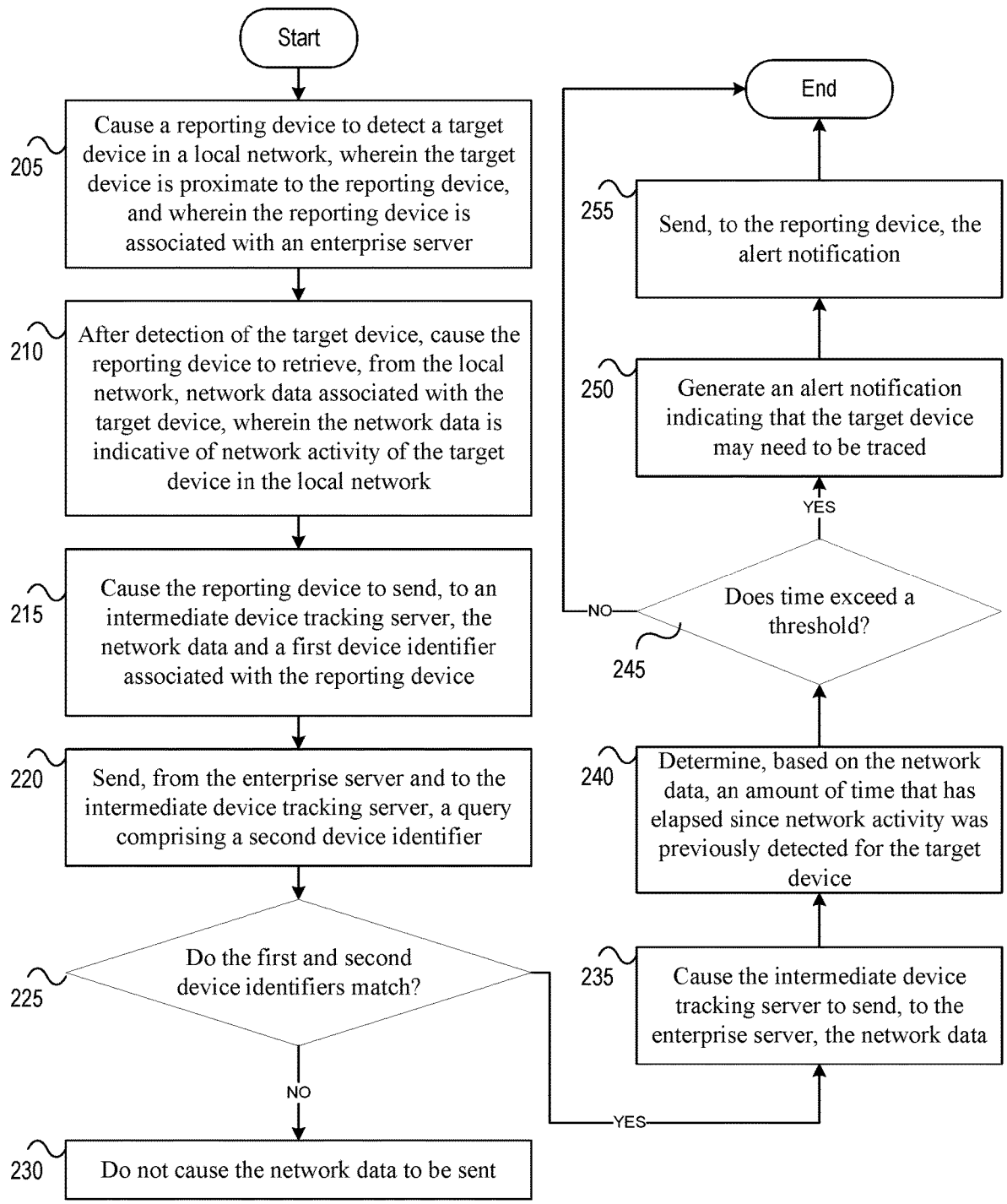
FIG. 2 depicts an illustrative method for an automated monitoring of proximate devices.

FIG. 2 depicts an illustrative method for an automated monitoring of proximate devices. Referring to FIG. 2, at step 205, target device monitoring computing platform 110 having at least one processor, and memory storing computer-readable instructions may cause a reporting device to detect a target device in a local network, where the target device is proximate to the reporting device, and where the reporting device is associated with an enterprise server. For example, the reporting device may detect the target device over a Wi-Fi network, a Bluetooth network, and so forth. Also, for example, one or more sensors associated with the reporting device may detect the target device when in proximity to the reporting device. Generally, the reporting device may be registered, and/or managed by enterprise computing infrastructure 120.

In some embodiments, target device monitoring computing platform 110 may cause the reporting device to download and install a mobile application to monitor the target device. For example, reporting device may be able to access an online application store and may be caused to download and install a mobile application. In some embodiments, the mobile application may be configured to detect a proximate target device, and/or retrieve data associated with the proximate device.

In some embodiments, the reporting device may be a network router, and target device monitoring computing platform 110 may cause the network router to upgrade firmware to monitor the target device. For example, the target device may be connected to a local network hosted by a wireless router. The wireless router may be configured to detect a proximate target device, and/or retrieve data associated with the proximate device.

In some embodiments, the local network may include one of a Bluetooth connectivity network, a near field communication network, a fifth generation cellular network, or a geolocation-based network. Generally, although the network is referred to as a local network, any network may provide the functionality. The reporting device and the target device may be on a Wi-Fi network, a Bluetooth network, a near field connectivity, a 5G cellular network, and so forth. Also, for example, the reporting device may be equipped with an array of sensors that may detect a proximate device, such as the target device.

At step 210, target device monitoring computing platform 110 may, after detection of the target device, cause the reporting device to retrieve, from the local network, network data associated with the target device, where the network data is indicative of network activity of the target device in the local network. For example, the network data may include one or more of: a hostname, an internet protocol (IP) address, and device location data. Generally, the reporting device may retrieve the network data from a common network node, a cell tower, a local computing network established by the reporting device, a common wireless hot-spot, and so forth. The target device may not be aware of the network data that is collected by the reporting device. In some embodiments, although the reporting device collects the network data, such activity may be performed in the background, with little or no interruption to a user of the reporting device. In some instances, the user of the reporting device may be unaware of data collection activities performed by the reporting device, as the reporting device may serve as an intermediary device that transmits the data.

In some embodiments, the computing platform may identify, based on the network data, a location of the target device, and where the retrieving of the network data may be automatically modified based on data privacy laws governing the identified location. For example, different geographic regions of the world may have different laws governing collection, storage, and/or use of data. Accordingly, target device monitoring computing platform 110 may generate a database of protocols associating a region with types of data that may be collected, how the data may be collected, how the collected data may be stored, transmitted, used, and so forth. Accordingly, target device monitoring computing platform 110 may determine a location of the reporting device and/or the target device based on the network data, and may automatically retrieve the appropriate protocol based on the location. Then, target device monitoring computing platform 110 may automatically configure a new protocol, and/or modify existing protocol for the reporting device.

At step 215, target device monitoring computing platform 110 may cause the reporting device to send, to an intermediate device tracking server, the network data and a first device identifier associated with the reporting device. For example, the query may be in a data interchange format, such as, for example, JavaScript Object Notation ("JSON"). As the reporting device collects the network data, such data may be sent on a real-time basis, or at regular intervals, to an intermediate server such as, for example, an intermediate device tracking server. The network data may be accompanied by a first device identifier indicating an identity of the reporting device. Generally, the device identifier for a device may be unique.

At step 220, target device monitoring computing platform 110 may send, from the enterprise server and to the intermediate device tracking server, a query comprising a second device identifier. For example, the query may be in a data interchange format, such as, for example, JSON. As described herein, an enterprise server may be interested in tracking the target device without knowledge of the target device. Accordingly, target device monitoring computing platform 110 may send a query to the intermediate device tracking server, and include a device identifier with the query. Generally, since the device identifier is uniquely associated with a reporting device, network data for target device proximate to the reporting device may be retrieved.

In some embodiments, the first device identifier and the second device identifier may be encrypted. For example, the first encrypted identifier and the second encrypted identifier may include two-way hashes. Additional and/or alternate means of encryption may be performed. As indicated herein, in some jurisdictions, encryption algorithms may be tailored to comply with data privacy and data protection laws.

At step 225, target device monitoring computing platform 110 may, in response to the query, cause the intermediate device tracking server to compare the first device identifier and the second device identifier. For example, intermediate device tracking server may receive network data from a plurality of reporting devices. Accordingly, to ensure that correct network data is being transmitted to the correct destination, the first device identifier and the second device identifier may be compared. For example, the first device identifier and the second device identifier may be hashed, and a comparison may be a comparison of the respective hashes.

Based on a determination that the first device identifier does not match the second device identifier, target device monitoring computing platform 110 may proceed to step 230. At step 230, target device monitoring computing platform 110 may cause the intermediate device tracking server to not send, to the enterprise server, the network data.

Based on a determination that the first device identifier matches the second device identifier, target device monitoring computing platform 110 may proceed to step 235. At step 235, target device monitoring computing platform 110 may cause the intermediate device tracking server to send, to the enterprise server, the network data. For example, upon confirmation that the first device identifier and the second device identifier match, the correct network data may be sent to the enterprise server. Accordingly, the enterprise server now has network data associated with the target device.

At step 240, target device monitoring computing platform 110 may determine, based on the network data, an amount of time that has elapsed since network activity was previously detected for the target device. For example, the network data may indicate a time of the last network activity by the target device. In some embodiments, target device monitoring computing platform 110 may determine a time threshold that indicates an optimal time that a device may be out of network. For example, the time threshold may be two weeks, or a month. In some embodiments, the time threshold may be based on a sensitivity of information likely to be on the target device. In some embodiments, the time threshold may be based on a security profile of the enterprise user associated with the reporting device.

At step 225, target device monitoring computing platform 110 may compare the amount of time to a predetermined time threshold. Based on a determination that the amount of time does not exceed the predetermined time threshold, target device monitoring computing platform 110 may proceed to end the process. For example, the time threshold may be a week, and the target device may be detected to report activity every 2-3 days. Accordingly, target device monitoring computing platform 110 may infer that no action may be required. However, target device monitoring computing platform 110 may continue to track the target device via the reporting device.

Based on a determination that the amount of time exceeds the predetermined time threshold, target device monitoring computing platform 110 may proceed to step 250. For example, the time threshold may be a week, and the target device may not be detected for 10 days. Accordingly, target device monitoring computing platform 110 may infer that the target device may be a potential security vulnerability. For example, the target device may be lost, stolen, or otherwise incapacitated. Therefore, at step 250, target device monitoring computing platform 110 may generate an alert notification indicating that the target device may need to be traced.

In some embodiments, target device monitoring computing platform 110 may determine that the target device cannot be traced. Then, the computing platform may automatically deactivate the target device. For example, target device monitoring computing platform 110 may disable the target device. As another example, target device monitoring computing platform 110 may lock down the target device. Also, for example, target device monitoring computing platform 110 may remotely destroy the hard drive of the target device.

In some embodiments, target device monitoring computing platform 110 may train a machine learning model to detect patterns of the network activity. For example, target device monitoring computing platform 110 may apply a machine learning model, such as, for example, an unsupervised learning technique, to detect patterns in network activity based on historical activity. For example, target device monitoring computing platform 110 may collect usage data, times when such usage occurs, location data (e.g., IP addresses), times when the reporting device reports the network data to the intermediate server, types of users that are associated with the reporting devices, geographical locations of the reporting devices, and/or target devices, user behavior analytics, device fingerprinting, and so forth. Generally, any detection of patterns based on when the target device was used can lead to a detection of anomalous behavior of the target device. In some embodiments, an unsupervised learning technique, such as, for example, a K-means clustering technique, or a hierarchical clustering technique may be utilized to detect patterns of usage. In some embodiments, target device monitoring computing platform 110 may assign usage thresholds, compare a usage to the threshold, and generate alert notifications based on the comparison.

Then, target device monitoring computing platform 110 may predict, based on the machine learning model, whether the target device may need to be traced. For example, the machine learning model may identify anomalous behavior of the target device. For example, a norm for behavior may be established, and any deviation from the norm beyond a standard deviation, may indicate anomalous behavior. Accordingly, target device monitoring computing platform 110 may automatically predict that the target device may need to be traced, and generate alert notifications based on the predicted behavior.

At step 255, target device monitoring computing platform 110 may send, to the reporting device, the alert notification. For example, target device monitoring computing platform 110 may send an alert notification to the reporting device indicating that the target device needs to be traced. In response, the reporting device may access other local networks to search for the target device. For example, the reporting device may have retrieved network data from a local Wi-Fi network. Upon receiving the alert notification, the reporting device may activate one or more sensors in an attempt to discover the target device. Also, for example, the reporting device may search on a cellular network to find proximate devices. In some embodiments, the alert notification may be in a form of a text message, a telephone call, and/or an electronic mail to a user of the reporting device. For example, the user of the reporting device may be asked to search for the target device and report back to the enterprise organization.

In some embodiments, target device monitoring computing platform 110 may train a machine learning model to detect a timing of the network activity. For example, the machine learning model may determine patterns of network activity based on times. For example, the target device may be visible on the network on weekends only. Also, for example, the target device may be visible on the network for 5 minutes at a time. As another example, historical usage may indicate that the target device has seasonal fluctuations in network activity. For example, the target device may not have been discoverable over the local network during past summers. In some embodiments, use of a target device during working hours of an enterprise user may be tracked. Then, target device monitoring computing platform 110 may compare, for an enterprise user associated with the reporting device, working hours with the detected timing. For example, some jurisdictions may have very strict rules on work hours and break time, and what an employee may do during break time. Accordingly, target device monitoring computing platform 110 may compare the detected timing of the network activity of the target device with the working hours of the enterprise user. Subsequently, target device monitoring computing platform 110 may, upon detecting anomalous working hours, automatically send a notification to the enterprise user.

In some embodiments, target device monitoring computing platform 110 may provide, via an interactive graphical user interface managed by the enterprise server, a search field to search for a target device, a selectable icon to initiate a query to the intermediate device tracking server, and information comprising a plurality of reporting devices, target devices associated with the plurality of reporting devices, and network data associated with the target devices. Generally, a large enterprise organization may track tens of thousands of target devices. Accordingly, target device monitoring computing platform 110 may facilitate tracking of such devices. In some embodiments, a security personnel associated with the enterprise organization tracking the target devices may be presented with an interactive graphical user interface. In some embodiments, target device monitoring computing platform 110 may provide a search field whereby information pertaining to a target device, an employee, a reporting device, and so forth may be queried. Also, for example, target device monitoring computing platform 110 may provide selectable icons (or other similar selection features) to allow the user to send a query to the intermediate device tracking server.

In some embodiments, target device monitoring computing platform 110 may provide information in a tabular format, where each row corresponds to a reporting device, and the columns correspond to a respective target device, columns for network data, such as for example, location data, IP address, MAC address, name and/or type of local network, and so forth. In some embodiments, target device monitoring computing platform 110 may provide historical information indicating previous notifications, and so forth. Also, for example, each target device may be associated with a status "Active" or "Inactive" indicating whether the target device is under active tracking or not. New rows may be added as new reporting devices are added. Also, for example, columns may be updated as network data is received.

Figure 3:
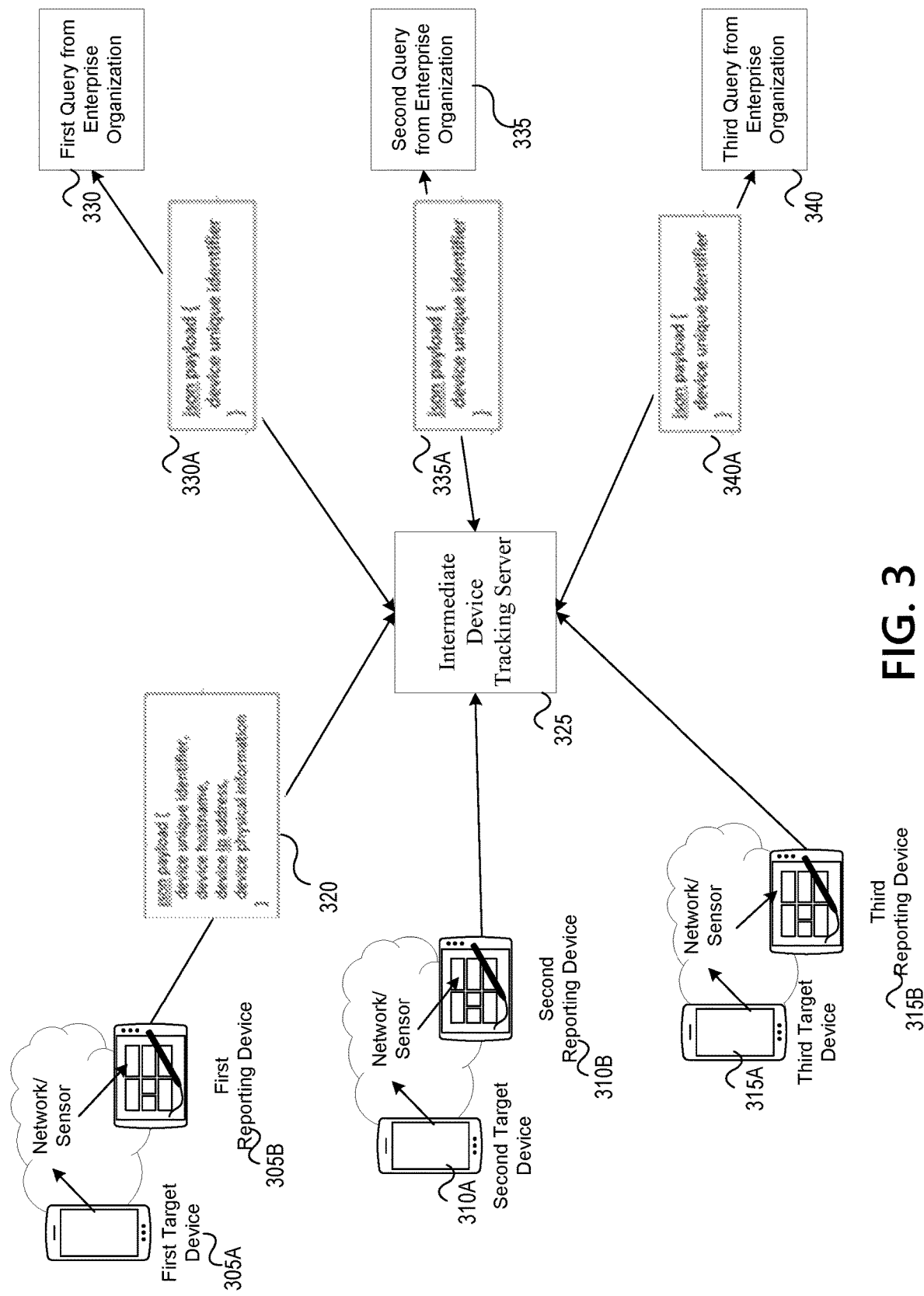
FIG. 3 depicts an illustrative method for an automated monitoring of a plurality of proximate devices.

FIG. 3 depicts an illustrative method for an automated monitoring of a plurality of proximate devices. Referring to FIG. 3, an enterprise organization may be interested in tracking a plurality of target devices, such as, for example, a first target device 305A, a second target device 310A, and a third target device 315A. As described herein, first target device 305A may be proximate to first reporting device 305B, and may be discoverable over a local network, or via a sensor associated with the first reporting device 305B. Similarly, second target device 310A may be proximate to second reporting device 310B, and may be discoverable over a local network, or via a sensor associated with the second reporting device 310B. Likewise, third target device 315A may be proximate to third reporting device 315B, and may be discoverable over a local network, or via a sensor associated with the third reporting device 315B.

As described herein, first reporting device 305B may retrieve network data 320 associated with the first target device 305A from the local network, and send network data 320 to intermediate device tracking server 325. In some embodiments, network data 320 may be in JSON format, and may include, for example, first device identifier for first reporting device 305B, a device identifier for target device 305A, device hostname, device IP address, device physical information, and so forth. Similarly, although not illustrated, second reporting device 310B and third reporting device 315B may retrieve network data from respective local networks, and send the network data to intermediate device tracking server 325. For example, second reporting device 310B may send a JSON payload including a second device identifier identifying second reporting device 310B, and third reporting device 315B may send a JSON payload including a third device identifier identifying third reporting device 315B.

An enterprise organization may send queries (e.g., at periodic intervals) to intermediate device tracking server 325 requesting the network data. For example, the enterprise organization may send a first query 330 to intermediate device tracking server 325. The query may be a JSON payload 330A and may include a device identifier for a target device. Intermediate device tracking server 325 may receive the query, compare the device identifier received with the first, second, and third device identifiers to determine if there is a match. Upon a determination that the device identifier received with first query 330 matches the first device identifier, intermediate device tracking server 325 may respond to first query 330 by sending, to the enterprise organization, network data 320 associated with first target device 305A.

Similarly, intermediate device tracking server 325 may receive a second query 335, including a JSON payload 335B, perform the match of device identifiers, and return network data associated with second target device 310A. Also, for example, intermediate device tracking server 325 may receive a third query 340, including a JSON payload 340B, perform the match of device identifiers, and return network data associated with third target device 315A.

Figure 4:
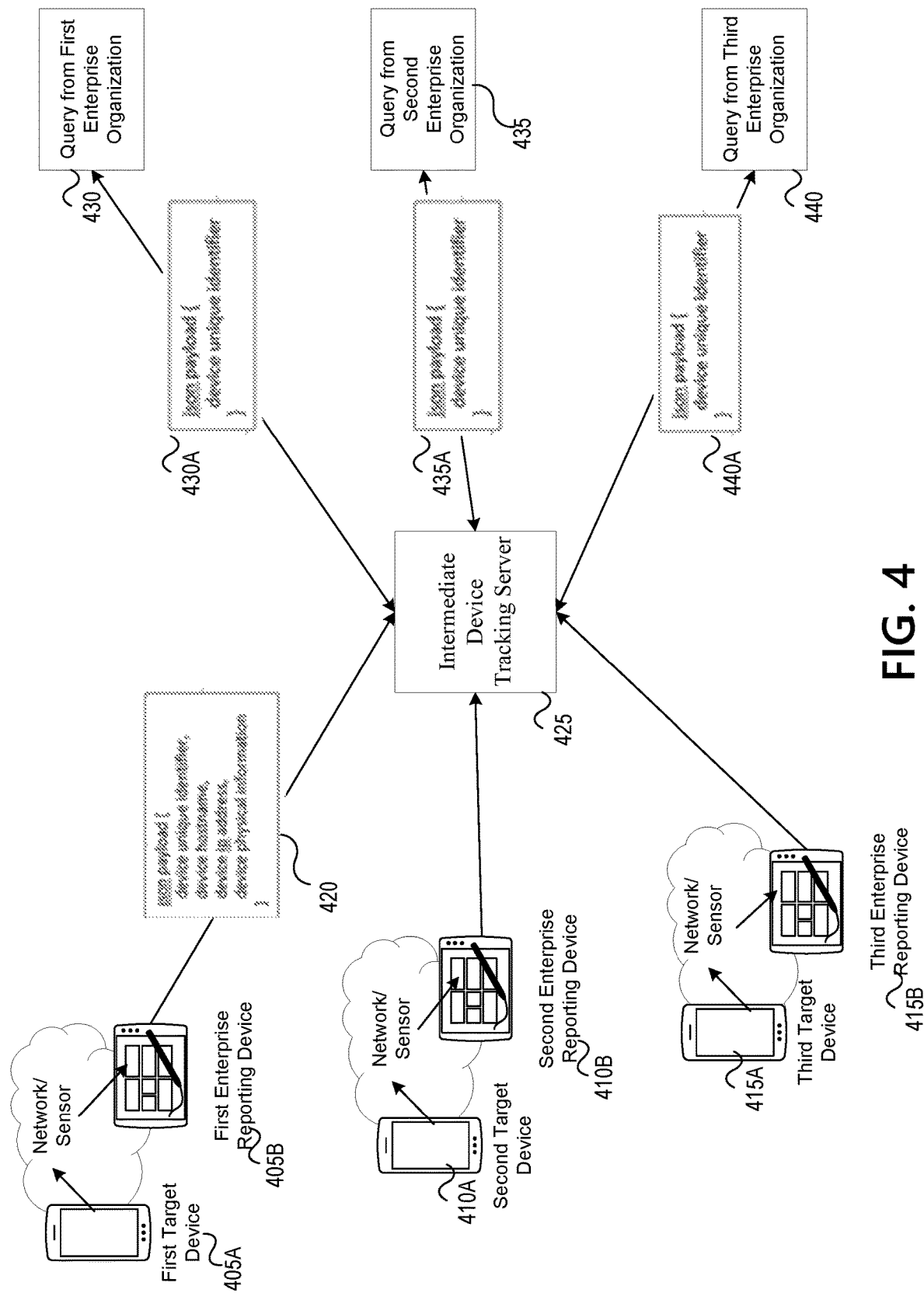
FIG. 4 depicts an illustrative method for an automated monitoring of a plurality of proximate devices for a plurality of enterprise organizations.

FIG. 4 depicts an illustrative method for an automated monitoring of a plurality of proximate devices for a plurality of enterprise organizations. Referring to FIG. 4, a plurality of enterprise organizations may be interested in tracking a plurality of target devices. For example, a first enterprise organization may be interested in tracking first target device 405A, a second enterprise organization may be interested in tracking second target device 410A, and a third enterprise organization may be interested in tracking third target device 415A. As described herein, first target device 405A may be proximate to first reporting device 405B, and may be discoverable over a local network, or via a sensor associated with the first reporting device 405B. Generally, first reporting device 405B may be registered to, or otherwise managed by, the first enterprise organization. Similarly, second target device 410A may be proximate to second reporting device 410B, and may be discoverable over a local network, or via a sensor associated with the second reporting device 410B. Generally, second reporting device 410B may be registered to, or otherwise managed by, the second enterprise organization. Likewise, third target device 415A may be proximate to third reporting device 415B, and may be discoverable over a local network, or via a sensor associated with the third reporting device 415B. Generally, third reporting device 415B may be registered to, or otherwise managed by, the third enterprise organization.

As described herein, first reporting device 405B may retrieve network data 420 associated with the first target device 405A from the local network, and send network data 420 to intermediate device tracking server 425. In some embodiments, network data 420 may be in JSON format, and may include, for example, first device identifier for first reporting device 405B, a device identifier for target device 405A, device hostname, device IP address, device physical information, and so forth. Similarly, although not illustrated, second reporting device 410B and third reporting device 415B may retrieve network data from respective local networks, and send the network data to intermediate device tracking server 425. For example, second reporting device 410B may send a JSON payload including a second device identifier identifying second reporting device 410B, and third reporting device 415B may send a JSON payload including a third device identifier identifying third reporting device 415B.

Enterprise organization may send queries (e.g., at periodic intervals) to intermediate device tracking server 425 requesting the network data. For example, the first enterprise organization may send a first query 430 to intermediate device tracking server 425. The first query 430 may be a JSON payload 430A and may include a device identifier for a target device. Intermediate device tracking server 425 may receive the query, compare the device identifier received with the first, second, and third device identifiers to determine if there is a match. Upon a determination that the device identifier received with first query 430 matches the first device identifier, intermediate device tracking server 425 may respond to first query 430 by sending, to the first enterprise organization, network data 420 associated with first target device 405A.

Similarly, intermediate device tracking server 425 may receive a second query 435 from the second enterprise organization, including a JSON payload 435B, perform the match of device identifiers, and return network data associated with second target device 410A to the second enterprise organization. Also, for example, intermediate device tracking server 425 may receive a third query 440 from the third enterprise organization, including a JSON payload 440B, perform the match of device identifiers, and return network data associated with third target device 415A to the third enterprise organization.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive commands or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor; and
   memory storing computer-readable instructions that, when executed by the at least one processor, cause the computing platform to:
   cause a reporting device to detect a target device in a local network, wherein the target device is proximate to the reporting device, and wherein the reporting device is associated with an enterprise server;
   after detection of the target device, cause the reporting device to retrieve, from the local network, network data associated with the target device, wherein the network data is indicative of network activity of the target device in the local network;
   cause the reporting device to send, to an intermediate device tracking server, the network data and a first device identifier associated with the reporting device;
   send, from the enterprise server and to the intermediate device tracking server, a query comprising a second device identifier;
   in response to the query, cause the intermediate device tracking server to compare the first device identifier and the second device identifier;
   based on a determination that the first device identifier matches the second device identifier, cause the intermediate device tracking server to send, to the enterprise server, the network data;

determine, based on the network data, an amount of time that has elapsed since network activity was previously detected for the target device;

compare the amount of time to a predetermined time threshold;

based on a determination that the amount of time exceeds the predetermined time threshold, generate an alert notification indicating that the target device may need to be traced; and send, to the reporting device, the alert notification.

2. The computing platform of claim 1, wherein the instructions to cause the reporting device to detect the target device comprise additional computer-readable instructions that, when executed by the at least one processor, cause the computing platform to:

cause the reporting device to download and install a mobile application to monitor the target device.

3. The computing platform of claim 1, wherein the reporting device comprises a network router, and wherein the instructions comprise additional computer-readable instructions that, when executed by the at least one processor, cause the computing platform to:

cause the network router to upgrade firmware to monitor the target device.

4. The computing platform of claim 1, wherein the local network comprises one of a Bluetooth connectivity network, a near field communication network, a fifth generation cellular network, or a geolocation-based network.

5. The computing platform of claim 1, wherein the first device identifier and the second device identifier are encrypted.

6. The computing platform of claim 1, wherein the instructions comprise additional computer-readable instructions that, when executed by the at least one processor, cause the computing platform to:

train a machine learning model to detect patterns of the network activity; and predict, based on the machine learning model, whether the target device may need to be traced.

7. The computing platform of claim 1, wherein the instructions comprise additional computer-readable instructions that, when executed by the at least one processor, cause the computing platform to:

identify, based on the network data, a location of the target device, and wherein the retrieving of the network data is automatically modified based on data privacy laws governing the identified location.

8. The computing platform of claim 1, wherein the instructions comprise additional computer-readable instructions that, when executed by the at least one processor, cause the computing platform to:

determine that the target device cannot be traced; and automatically deactivate the target device.

9. The computing platform of claim 1, wherein the instructions comprise additional computer-readable instructions that, when executed by the at least one processor, cause the computing platform to:

train a machine learning model to detect a timing of the network activity;

compare, for an enterprise user associated with the reporting device, working hours with the detected timing; and upon detecting anomalous working hours, automatically send a notification to the enterprise user.

10. The computing platform of claim 1, wherein the instructions comprise additional computer-readable instructions that, when executed by the at least one processor, cause the computing platform to:

provide, via an interactive graphical user interface managed by the enterprise server, a search field to search for a target device, a selectable icon to initiate a query to the intermediate device tracking server, and information comprising a plurality of reporting devices, target devices associated with the plurality of reporting devices, and network data associated with the target devices.

11. One or more non-transitory computer-readable media storing instructions that, when executed by a computing platform comprising at least one processor, and memory, cause the computing platform to:

cause a reporting device to retrieve, from a local network, network data associated with a target device, wherein the network data is indicative of network activity of the target device in the local network, and wherein the target device is proximate to the reporting device, and wherein the reporting device is associated with an enterprise server;

cause the reporting device to send, to an intermediate device tracking server, the network data and a first encrypted identifier associated with the reporting device;

send, from the enterprise server and to the intermediate device tracking server, a query comprising a second encrypted identifier;

in response to the query, cause the intermediate device tracking server to compare the first encrypted identifier and the second encrypted identifier;

based on a determination that the first encrypted identifier matches the second encrypted identifier, cause the intermediate device tracking server to send, to the enterprise server, the network data;

train a machine learning model to detect patterns of the network activity;

predict, based on the machine learning model, whether the target device may need to be traced;

based on a determination that the target device may need to be traced, generate an alert notification; and send, to the reporting device, the alert notification.

12. The computer-readable media of claim 11, wherein the instructions comprise additional computer-readable instructions that, when executed by the at least one processor, cause the computing platform to:

cause the reporting device to download and install a mobile application to monitor the target device in the local network.

13. The computer-readable media of claim 11, wherein the reporting device comprises a network router, and wherein the instructions comprise additional computer-readable instructions that, when executed by the at least one processor, cause the computing platform to:

cause the network router to upgrade firmware to monitor the target device.

14. The computer-readable media of claim 11, wherein the first encrypted identifier and the second encrypted identifier comprise two-way hashes.

15. The computer-readable media of claim 11, wherein the local network comprises one of a local area network, a Bluetooth connectivity network, a near field communication network, a fifth generation cellular network, or a geolocation-based network.

16. The computer-readable media of claim 11, wherein the instructions comprise additional computer-readable instructions that, when executed by the at least one processor, cause the computing platform to:

identify, based on the network data, a location of the target device, and wherein the retrieving of the network data is automatically modified based on data privacy laws governing the identified location.

17. The computer-readable media of claim 11, wherein the instructions comprise additional computer-readable instructions that, when executed by the at least one processor, cause the computing platform to:

determine that the target device cannot be traced; and
automatically deactivate the target device.

18. The computer-readable media of claim 11, wherein the instructions comprise additional computer-readable instructions that, when executed by the at least one processor, cause the computing platform to:

train a machine learning model to detect a timing of the network activity;

compare, for an enterprise user associated with the reporting device, working hours with the detected timing; and upon detecting anomalous working hours, automatically send a notification to the enterprise user.

19. The computer-readable media of claim 11, wherein the instructions comprise additional computer-readable instructions that, when executed by the at least one processor, cause the computing platform to:

provide, via an interactive graphical user interface managed by the enterprise server, a search field to search for a target device, a selectable icon to initiate a query to the intermediate device tracking server, and information comprising a plurality of reporting devices, target devices associated with the plurality of reporting devices, and network data associated with the target devices.

20. A method, comprising:

at a computing platform comprising at least one processor, and memory:

receiving, from a reporting device associated with an enterprise server, network data and a first hashed device identifier associated with the reporting device, wherein the network data is indicative of network activity of a target device in a local network, and wherein the target device is proximate to the reporting device, and wherein the network data comprises one or more of: a hostname, an internet protocol (IP) address, and device location data;

receiving, from the enterprise server, a query comprising a second hashed device identifier;

comparing the first hashed device identifier and the second hashed device identifier; and based on a determination that the first hashed device identifier matches the second hashed device identifier, sending, to the enterprise server, the network data.

* * * * *